(12) United States Patent
Chiu et al.

(10) Patent No.: US 11,308,171 B2
(45) Date of Patent: Apr. 19, 2022

(54) APPARATUS AND METHOD FOR SEARCHING LINKED LISTS

(71) Applicant: Silicon Motion, Inc., Hsinchu County (TW)

(72) Inventors: Shen-Ting Chiu, Miaoli County (TW); Lien-Yu Lee, Hsinchu County (TW)

(73) Assignee: SILICON MOTION, INC., Zhubei (TW)

( * ) Notice: Subject to any disclaimer, the term of this patent is extended or adjusted under 35 U.S.C. 154(b) by 357 days.

(21) Appl. No.: 16/250,326

(22) Filed: Jan. 17, 2019

(65) Prior Publication Data

US 2020/0012694 A1 Jan. 9, 2020

(30) Foreign Application Priority Data

Jul. 9, 2018 (CN) .......................... 201810746676.3

(51) Int. Cl.
*G06F 16/953* (2019.01)
*G06F 16/22* (2019.01)

(52) U.S. Cl.
CPC ........ *G06F 16/953* (2019.01); *G06F 16/2237* (2019.01)

(58) Field of Classification Search
CPC ............................ G06F 16/953; G06F 16/2237
USPC ........................................................ 707/706
See application file for complete search history.

(56) References Cited

U.S. PATENT DOCUMENTS

| | | | |
|---|---|---|---|
| 5,924,098 A | 7/1999 | Kluge | |
| 6,067,547 A | 5/2000 | Douceur | |
| 6,570,877 B1 * | 5/2003 | Kloth | H04L 45/00 370/392 |
| 6,633,865 B1 * | 10/2003 | Liao | H04L 29/12132 |
| 6,683,615 B1 * | 1/2004 | Baldwin | G06T 1/60 345/532 |
| 9,043,675 B2 | 5/2015 | Kato et al. | |
| 9,569,561 B2 * | 2/2017 | Wildman | H04L 9/12 |
| 9,942,169 B1 | 4/2018 | Detwiler | |
| 2009/0241010 A1 * | 9/2009 | Yano | G11C 29/78 714/764 |
| 2010/0191897 A1 | 7/2010 | Zhang et al. | |

(Continued)

FOREIGN PATENT DOCUMENTS

| | | |
|---|---|---|
| CN | 1145881 C | 4/2004 |
| TW | 201617885 A | 5/2016 |
| TW | 201741883 A | 12/2017 |

OTHER PUBLICATIONS

Taiwanese Search Report, dated Sep. 6, 2019, for Taiwanese Application No. 107136225.

(Continued)

*Primary Examiner* — Robert W Beausoliel, Jr.
*Assistant Examiner* — Arthur Ganger
(74) *Attorney, Agent, or Firm* — Birch, Stewart, Kolasch & Birch, LLP

(57) ABSTRACT

The invention introduces an apparatus for searching linked lists at least including: a memory arranged to operably store a linked list; a linked-list search engine arranged to operably search content of the linked list until a search success or fail and generate a search result; and a processing unit arranged to operably write the content of the linked list into the memory, drive the linked-list search engine to start a search on the linked list and obtain the search result from the linked-list search engine.

16 Claims, 7 Drawing Sheets

(56) References Cited

U.S. PATENT DOCUMENTS

| | | | |
|---|---|---|---|
| 2011/0185105 A1* | 7/2011 | Yano | G06F 12/0246 |
| | | | 711/103 |
| 2015/0106560 A1* | 4/2015 | Perego | G06F 12/0246 |
| | | | 711/105 |
| 2015/0261444 A1 | 9/2015 | Yoshii et al. | |
| 2016/0026408 A1* | 1/2016 | Peterson | G06F 12/0238 |
| | | | 711/103 |
| 2016/0140048 A1 | 5/2016 | Mukherjee et al. | |
| 2017/0286313 A1 | 10/2017 | Jiang et al. | |
| 2019/0056882 A1* | 2/2019 | Feldman | G06F 3/061 |

OTHER PUBLICATIONS

English translation of the Taiwanese Search Report for Taiwanese Application No. 107123751, dated Feb. 4, 2019.

* cited by examiner

APPARATUS AND METHOD FOR SEARCHING LINKED LISTS

CROSS-REFERENCE TO RELATED APPLICATIONS

This application claims the benefit Patent Application No. 201810746676.3, filed in China on Jul. 9, 2018; the entirety of which is incorporated herein by reference for all purposes.

BACKGROUND

The disclosure generally relates to computation equipment and, more particularly, to apparatus and method for searching linked lists.

Linked list is a data structure consisting of a collection of nodes which together represent a sequence. It is a linear collection of data elements, whose order is not given by their physical placement in memory. Instead, each element points to the next. Typically, each node contains data and a reference (i.e., a link) to the next node in the sequence. This structure allows for efficient insertion or removal of elements from any position in the sequence. Typically a search on a linked list is executed by a Central Processing Unit (CPU), the core of a computer system. The overall performance can be improved by removing workloads for searching linked lists from the CPU. Thus, it is desirable to have dedicated hardware other than the CPU, and a method using the dedicated hardware for searching linked lists to improve the overall performance.

SUMMARY

In an aspect of the invention, an apparatus for searching linked lists is introduced to at least include: a memory arranged to operably store a linked list; a linked-list search engine arranged to operably search content of the linked list until a search success or fail and generate a search result; and a processing unit arranged to operably write the content of the linked list into the memory, drive the linked-list search engine to start a search on the linked list and obtain the search result from the linked-list search engine.

In another aspect of the invention, a method for searching linked lists is introduced to at least include: obtaining a memory address of a start node of a linked list, and a search value from a configuration register set by a processing unit; repeatedly executing a loop for obtaining and processing nodes of the linked list from the start node sequentially until a search success or fail; storing a search result and information about a search success when a search on the linked list for the search value is successful, thereby enabling the processing unit to obtain the search result and the search success information; and storing information about a search fail when the search on the linked list for the search value has fails, thereby enabling the processing unit to obtain the search fail information.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
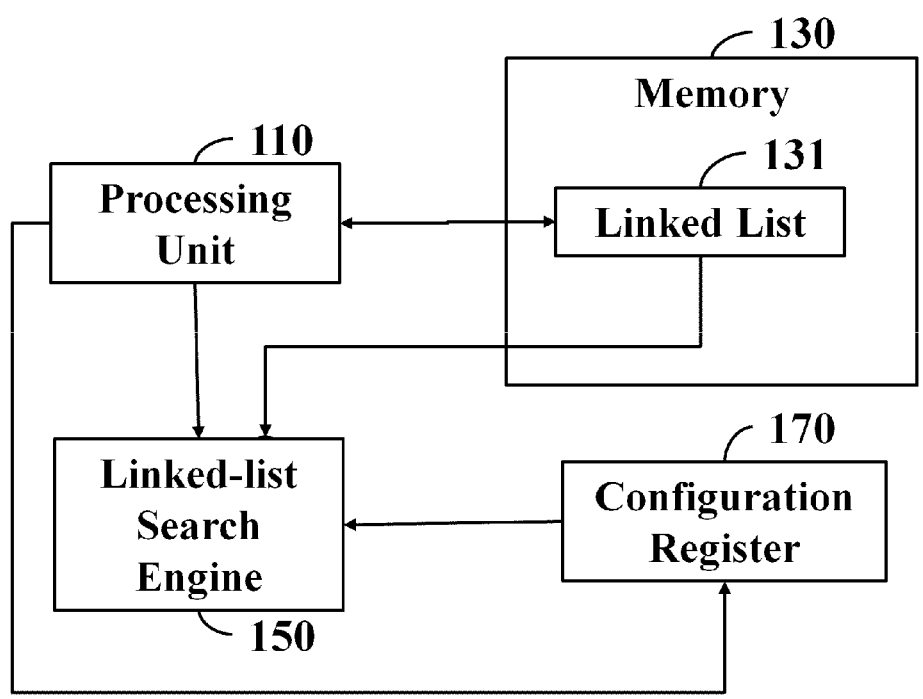
FIG. 1 is a block diagram of a linked-list search apparatus according to an embodiment of the invention.

Refer to FIG. 1. A linked-list search apparatus may include a processing unit 110, a memory 130 and a linked-list search engine 150. The linked-list search apparatus may be practiced in NAND flash devices or others for converting logical locations to physical locations and/or the converses more efficiently. The processing unit 110 may be implemented in numerous ways, such as with general-purpose hardware (e.g., a single processor, multiple processors or graphics processing units capable of parallel computations, a lightweight general-purpose processor, or others) that is programmed using firmware or software instructions to perform the functions of logical-physical location conversions. The memory 130 may be a Dynamic Random Access Memory (DRAM), Static Random Access Memory (SRAM) or a volatile memory of another type. It is understood that the following actions and operations are performed when the processing unit 110 loads and executes relevant firmware or software instruction and simply referred to as that performed by the processing unit 110 for brevity. The processing unit 110 is coupled to the memory 130 and writes the content of a linked list 131 in the memory 130. Since a search on the linked list 131 consumes a certain time period, embodiments of the linked-list search apparatuses employ a linked-list search engine 150 to complete the search, so as to avoid the computation-capacity consumption of the processing unit 110. The linked-list search engine 150 is dedicate hardware, coupled to the memory 130, for searching the content of the linked list 131 until a success or fail, and accordingly generating a searched result. The searched result may be stored in an allocated region of the memory 130 or dedicate registers (not shown in FIG. 1). Moreover, for searching of a wide range of linked lists, the link-list search engine 150 is equipped with a configuration register 170 for storing information about a data structure of each node of the linked list 131, a memory address of a start node thereof to be searched, a search direction and a value to be searched. The processing unit 110 coupled to the configuration register 170 may inform the linked-list search engine 150 how to search the content of the linked list 131 by setting the configuration register 170. After the content of the linked list 131 has been prepared in the memory 130, the processing unit 110 drives the linked-list search engine 150 to start a search on the linked list 131 and obtains a searched result from the linked-list search engine 150.

Figure 2:
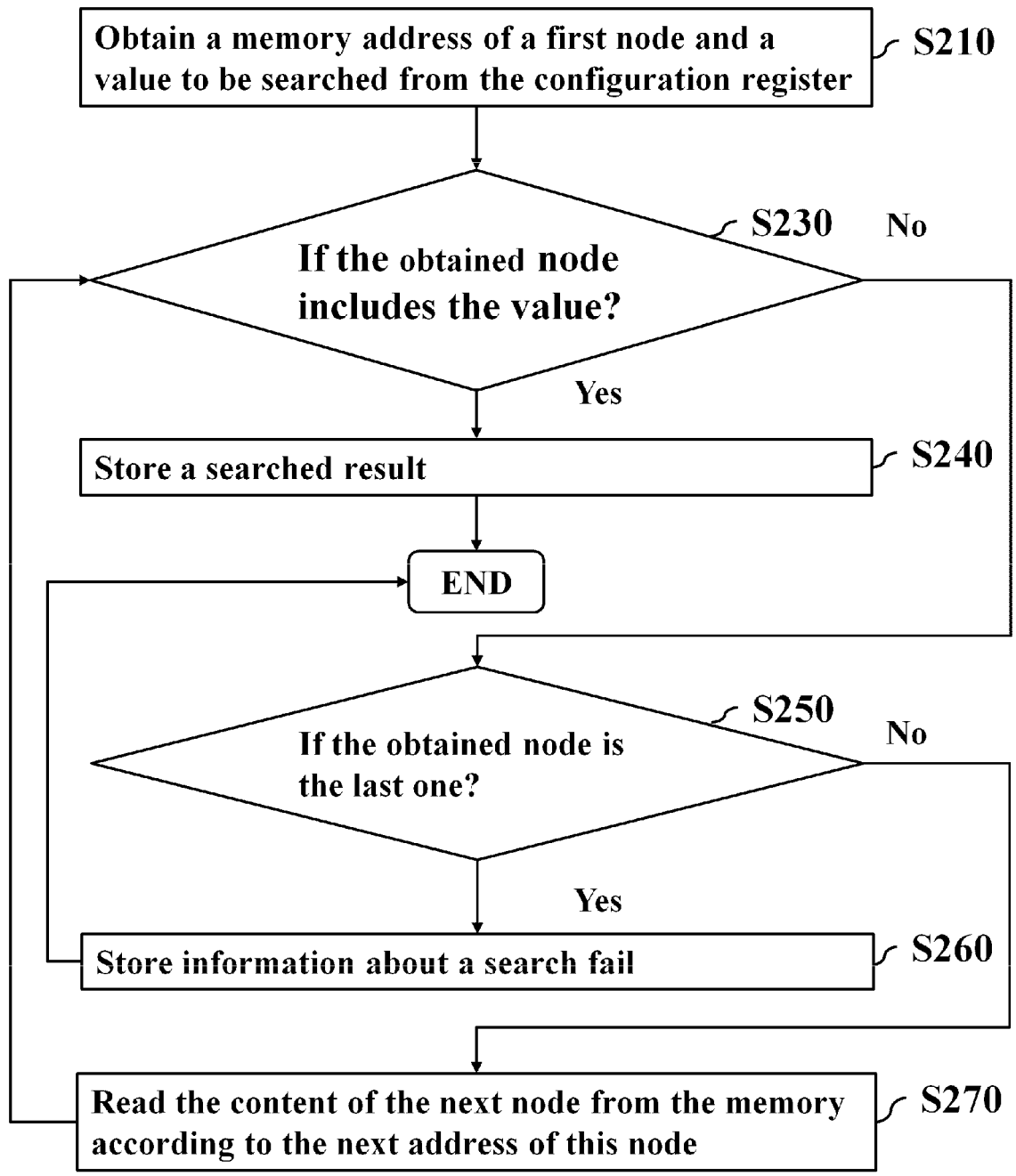
FIG. 2 is a flowchart illustrating a method for searching linked lists according to an embodiment of the invention.

A method for searching linked lists as shown in FIG. 2 is performed by the linked-list search engine 150. The linked-list search engine 150 obtains a memory address of the head node (also referred to as a start node) and a value to be searched from the configuration register 170, and obtains the content of the start node according to the memory address (step S210). Next, the linked-list search engine 150 repeatedly executes a loop (steps S230, S250 and S270) for obtaining and processing the nodes of the linked list 131 from the start node sequentially until a success (the "Yes" path of step S230) or a fail (the "Yes" path of step S250). After obtaining the first or the next node from the memory 130 (step S210 or S270) in each iteration, it is determined whether the obtained node includes the value to be searched for the processing unit 110 (step S230). If a search on a node is successful (the "Yes" path of step S230), then the linked-list search engine 150 stores a searched result, for example, including a memory address of the found node, corresponding outcomes, a quantity of nodes have been searched, and so on, and information about a search success, enabling the processing unit 110 to obtain that (step S240). If a search on a node is failed (the "No" path of step S230), it is determined whether the node is the last one of the linked list 131 (step S250). If the last node has been reached (the "Yes" path of step S250), then the linked-list search engine 150 stores information about a search fail to enable the processing unit 110 to obtain that (step S260). If the last node hasn't been reached (the "No" path of step S250), then the linked-list search engine 150 reads the content of the next node from the memory 130 according to the next address of this node (step S270). The content of each node and search details with different hardware circuits will be described in the following passages.

Those artisans may modify FIG. 2 to make a search on the linked list from the tail node (also referred to as a start node) to the prior ones sequentially until a success or fail.

In some embodiments, the processing unit 110 may process tasks in parallel of a search on the linked list 131 by the linked-list search engine 150. After a predefined time period, the processing unit 110 may attempt to obtain a searched result by traversing the memory 130. When no result has been stored in the memory 130, the processing unit 110 may continue to process unfinished tasks until the next time period has elapsed. In alternative embodiments, after completing a search, the linked-list search engine 150 may issue a signal (e.g. an interrupt) to enable the processing unit 110 to obtain a searched result. In still alternative embodiments, after completing a search, the linked-list search engine 150 may set a status register (not shown in FIG. 1) to inform the processing unit 110 of information about a searched result. The processing unit 110 may periodically traverse the status register. Once the status register has been set, the processing unit 110 obtains a searched result. With the coordination of the processing unit 110 with the linked list search engine 150, a search on the linked list 131 can be performed in parallel of other tasks to improve the overall performance. That is, the processing unit 110 can execute other tasks parallelly during the linked-list search engine 150 searches the content of the linked list 131.

Figure 4:
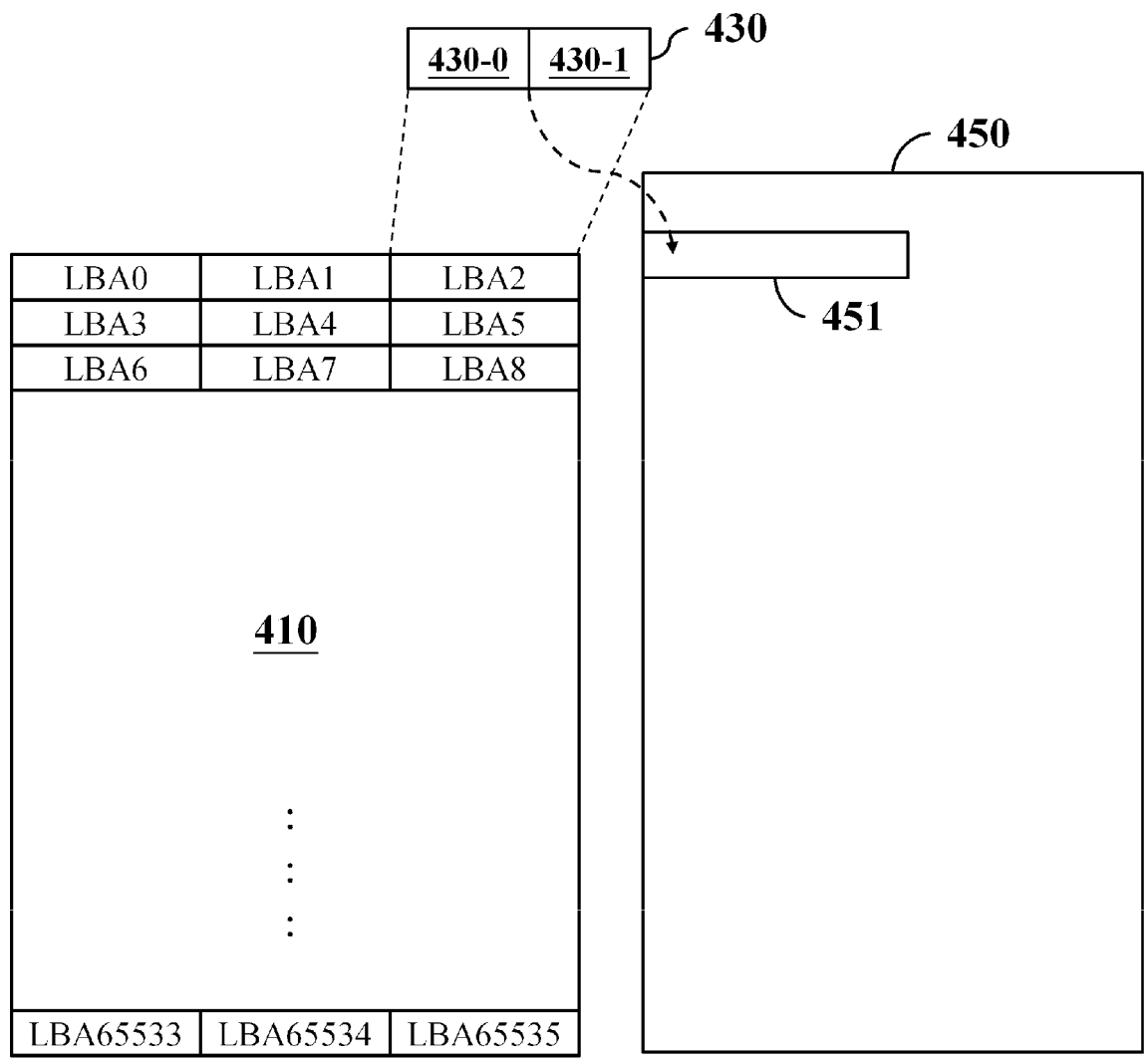
FIG. 4 is a schematic diagram illustrating storage mappings according to an embodiment of the invention.

Since the NAND flash memory device is not a random access device, to improve data write efficiency, a host (not shown in FIG. 1) may provide continuous data longer than a predefined length, such as 128K bytes, such that the flash memory device can program the data into several storage sub-units thereof in parallel. After user data of a logical address has been successfully programmed into a physical address of the storage sub-unit, the flash memory device may update mapping information between the logical and physical addresses of a temporary storage mapping table temporarily stored in a SRAM. After the user data of a predefined number of logical addresses have been programmed successfully, a storage mapping table (also referred to as a Host-to-Flash H2F table) stored in a non-volatile flash memory unit is updated according to the content of the temporary storage mapping table. Refer to FIG. 4. The storage mapping table 410 may store physical-location (PL) information of the logical locations sequentially and occupy space ranging from 64M to 1G bytes. Each logical location may be represented by a Logical Block Address (LBA) and each LBA maps to a fixed length of physical storage space, such as 512 bytes. For example, the storage mapping table 410 sequentially stores PL information from LBA 0 to LBA 65535. Data of several continuous logical locations (such as LBA 0 to LBA 7) may form a host page. PL information 430 may be represented by four bytes: the former two bytes 430-0 record a physical-block number; and the latter two bytes 430-1 record a unit number. For example, the PL information 430 corresponding to the logical location LBA 2 points to a physical region 451 of a physical block 450, by which the bytes 430-0 record an identifier of the physical block 450 and the bytes 430-1 record a unit number of the physical block 450.

Figure 3:
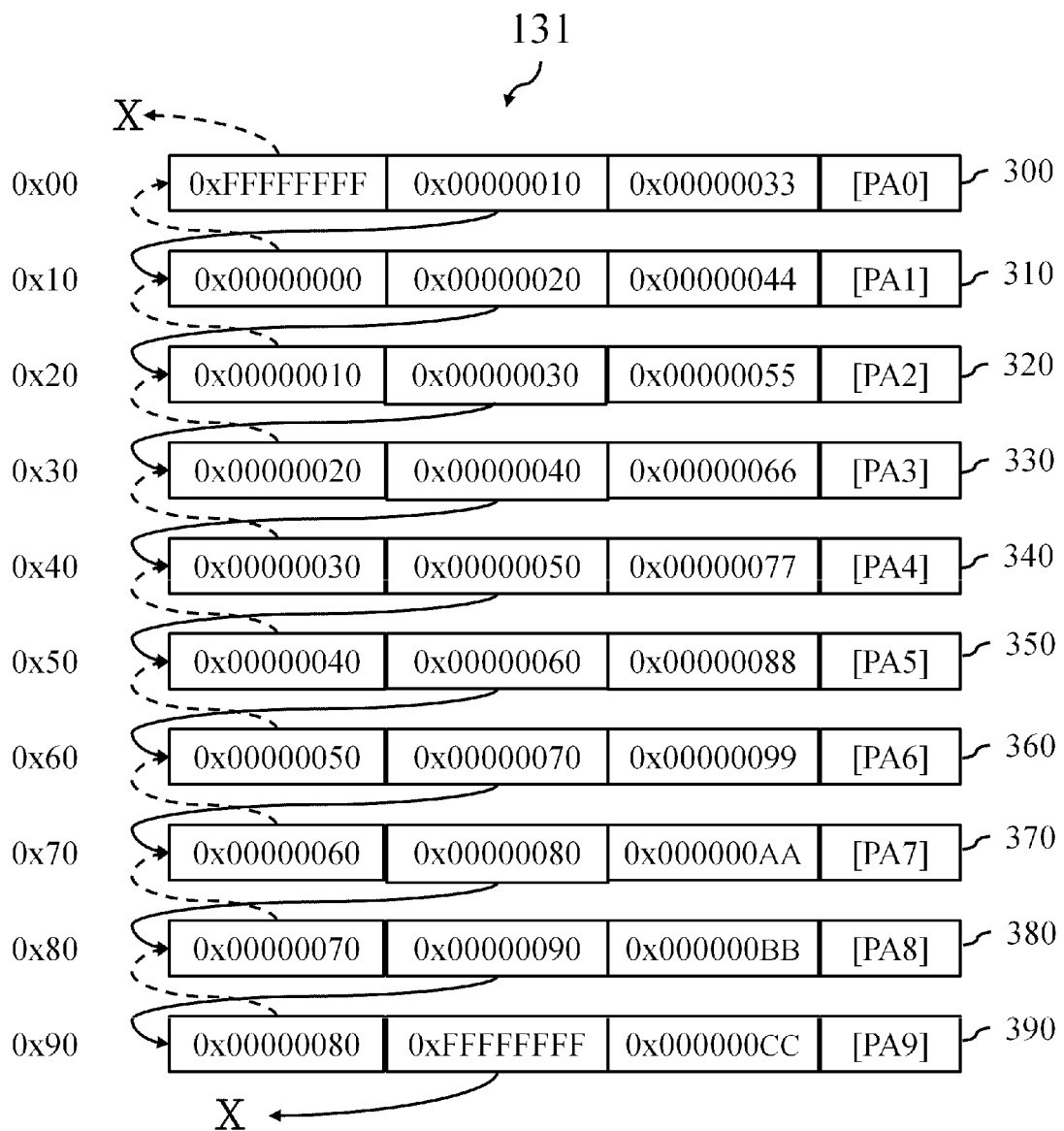
FIG. 3 is a schematic diagram of a linked list according to an embodiment of the invention.

For the NAND flash memory device usually receives requests for reading sequential host pages from a host, the linked-list search apparatus can be used to accelerate logical-to-physical location conversions for the host pages. Refer to FIG. 3. The linked list 131 may include ten nodes 300 to 390 and each node may store data in long words (i.e. sixteen bytes). Within each node, bytes 0 to 3 store a memory address pointing to its backward node (also referred to as the backward-node address), bytes 4 to 7 store a memory address pointing to its forward node (also referred to as the forward-node address), bytes 8 to 11 store a host page number and bytes 12 to 15 store corresponding PL information. The backward-node address may store dummy data (NULL, e.g. "0xFFFFFFFF") to indicate that this node is the first node of the linked list while the forward-node address may store dummy data to indicate that this node is the last node of the linked list. For example, the nodes 300 and 390 are the first and last nodes of the linked list, respectively. The start address of the node 300 is "0x00000000", the start address of the node 310 is "0x00000010" and the rest can be deduced by analogy. The forward-node address of the node 300 points to the memory address "0x00000010" (i.e. the start address of the node 310), the forward-node address of the node 310 points to the memory address "0x00000020" (i.e. the start address of the node 320) and the rest can be deduced by analogy. The backward-node address of the node 390 points to the memory address "0x00000080" (i.e. the start address of the node 380), the backward-node address of the node 380 points to the memory address "0x00000070" (i.e. the start address of the node 370) and the rest can be deduced by analogy. The host page number stored in the node 300 is "0x00000033" and the corresponding PL information thereof is indicated by the variable PA0, the host page number stored in the node 300 is "0x00000044" and the corresponding PL information thereof is indicated by the variable PA1 and the rest can be deduced by analogy. Values of the variables PA0 to PA9 may be set by the processing unit 110. Although embodiments of the invention describe the nodes 300 to 390 of the linked list 131 arranged in an ascending order of the memory addresses to make reading easier, after certain insertions and removals to the linked list 131, the order of the nodes 300 to 390 are usually different from the original order.

Figure 5:
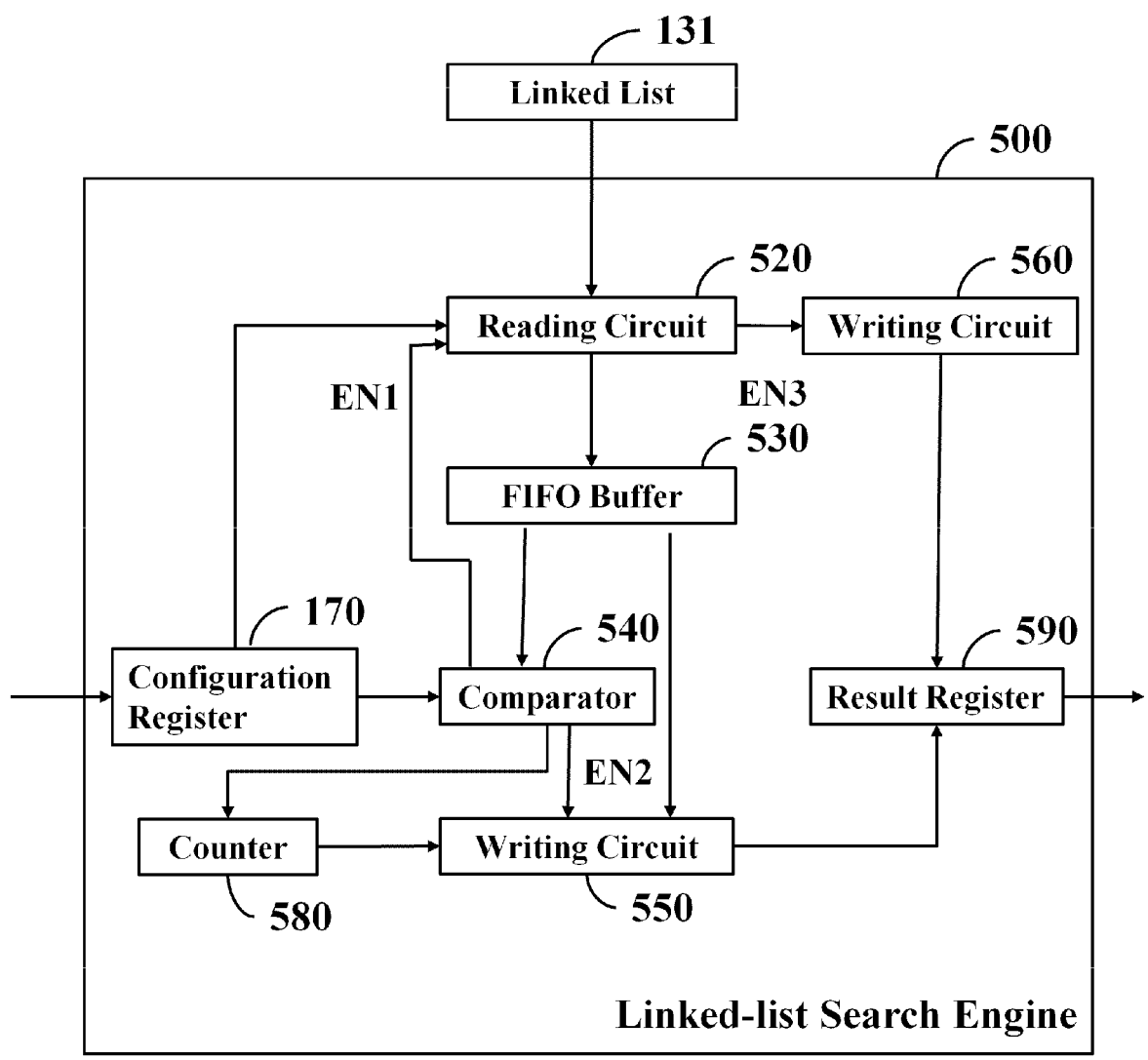
FIGS. 5 to 7 are block diagrams illustrating linked-list search apparatuses according to embodiments of the invention.
Figure 6:
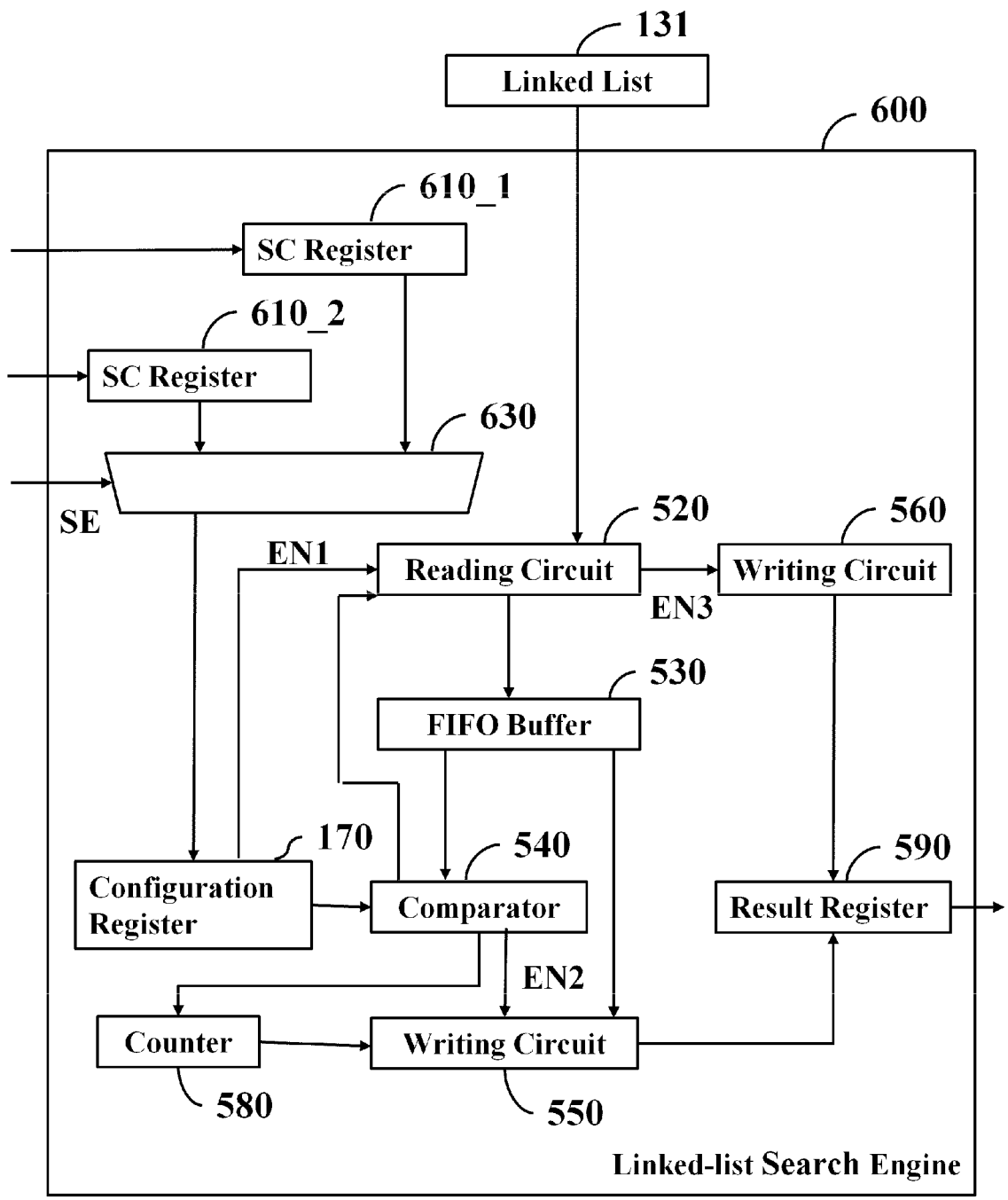
Figure 7:
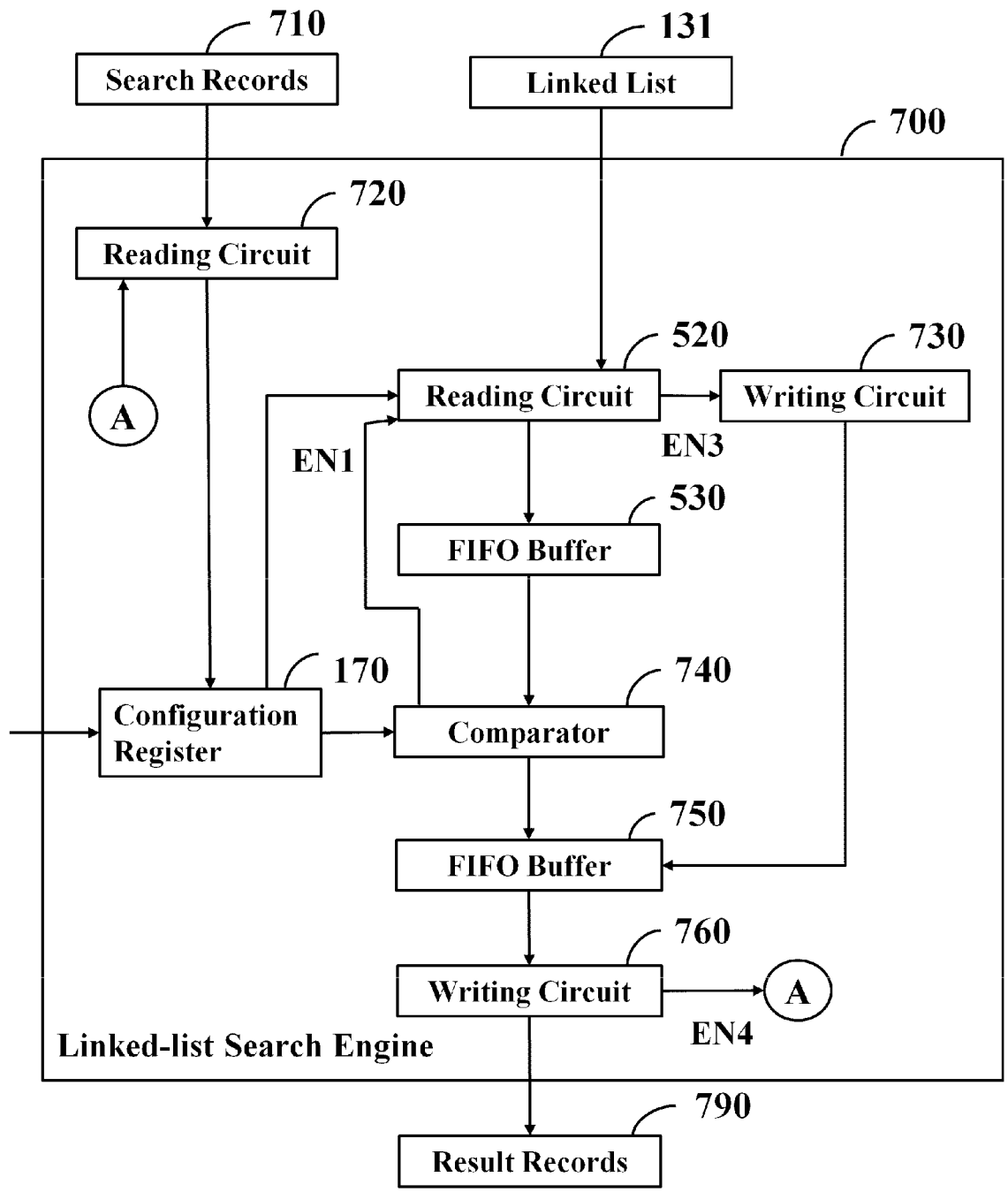

FIGS. 5-7 are block diagrams of the linked-list search engines to practice the method as shown in FIG. 2.

Refer to FIG. 5. The linked-list search engine 500 may include a configuration register 170, a reading circuit 520, a First-In-First-Out (FIFO) buffer 530, a comparator 540, writing circuits 550 and 560, and a result register 590. The processing unit 110 may set the configuration register 170 to store a start address of the first node, data-structure information of each node (such as offsets of the backward-node address, the forward-node address, comparison data, a corresponding result, etc.), a search value and a search direction. Once the processing unit 110 enables the linked-list search engine 500, the reading circuit 520 may read the forward- or backward-node address, the comparison data and the corresponding result of the first node from the linked list 131 according to the content of the configuration register 170 and output the comparison data and the corresponding result to the FIFO buffer 530. In addition, the reading circuit 520 may output the start address of the first node to the FIFO buffer 530. The comparator 540 compares the search value of the configuration register 170 with the comparison data of the FIFO buffer 530. When they are different, the comparator 540 may output an enabling signal EN1 to the reading circuit 520 for driving the reading circuit 520 to read the content of the next node from the linked list 131. The reading circuit 520 may determine whether any node has not been processed, for example, whether the forward- or backward-node address is not dummy data. If so, then the reading circuit 520 may read the aforementioned values from the forward- or backward node of the linked list 131 according to the forward- or backward-node address as well as the mentioned content and output all or a part of the values to the FIFO buffer 530. If not, then the reading circuit 520 may output an enabling signal EN3 to the writing circuit 560 for driving the writing circuit 560 to store information about a search fail in the result register 590. When the search value of the configuration register 170 is the same as the comparison data of the FIFO buffer 530, the comparator 540 may output an enabling signal EN2 to the writing circuit 550 for driving the writing circuit 550 to store the corresponding result 530 and the start address of the currently searched node (i.e. the matched node) that are stored in the FIFO buffer 530, and information about a search success in the result register 590. For example, bytes 0 to 3 of the result register 590 store the corresponding result, bytes 4 to 7 thereof store the start address of the currently searched node and a byte 8 stores information about a search success or fail. When a search is successful, the byte 8 is set to "1"; otherwise, set to "0".

For optimizing the arrangement for the nodes of the linked list 131, in some embodiments, the linked-list search engine 500 may include a counter 580 coupled to the comparator 540 and the writing circuit 550, that is initiated to zero each time a new search starts. Each time a comparison of the search value of the configuration register 170 with the comparison data of the FIFO buffer 530 is performed, the comparator 540 forces the counter 580 to increment by one. When determining that the search value of the configuration register 170 is the same as the comparison data of the FIFO buffer 530, the comparator 540 drives the writing circuit 550 to store the value of the counter 580 in the result register 590. For example, a byte 9 of the result register 590 stores the counter value.

The comparison data of each node may be compound data, for example, including at least two sorts of data. In some embodiments, the processing unit 110 may set the configuration register 170 to indicate that four bytes are used for storing a mask. The comparator 540 may perform a logic AND operation on the comparison data of the FIFO buffer 530 with the mask of the configuration register 170 to generate masked comparison data and subsequently determine whether the search value of the configuration register 170 is the same as the masked comparison data. If so, then the comparator 540 may drive the writing circuit 550 to store the corresponding result and the start address of the currently searched node, that are stored in the FIFO buffer 530, and information about a search success in the result register 590. For example, as shown in FIG. 3, the former two bytes of the host page number indicates a specific number of a T1 table and the latter two bytes thereof indicates a specific number of a T7 table. When the search value of the configuration register 170 is a specific number of the T1 table, the processing unit 110 may store a mask "0xFFFF0000" in the configuration register 170, whereby enabling the comparator 540 to ignore the latter two bytes of the host page number (i.e. a specific number of the T7 table). When the search value of the configuration register 170 is a specific number of the T7 table, the processing unit 110 may store a mask "0x0000FFFF" in the configuration register 170, whereby enabling the comparator 540 to ignore the former two bytes of the host page number (i.e. a specific number of the T1 table).

The comparison data of each node may include a bit that are not required to compare, for example, the most significant bit. In some embodiments, the processing unit 110 may set the configuration register 170 to use one byte for storing information about an ignore bit, for example, "0x1F" represents that the bit 31 of the comparison data can be ignored. The comparator 540 may generate a mask according to information of the ignored bit, perform a logic AND operation on the comparison data of the FIFO buffer 530 with this mask and determine whether the search value of the configuration register 170 is the same as the masked comparison data. If so, then the comparator 540 drives the writing circuit 550 to store the corresponding result and the start address of the currently searched node, that are stored in the FIFO buffer 530, and information about a search success in the result register 590. For example, the ignore bit is bit 31, the mask is "0x7FFFFFFF".

Refer to the linked list 131 of FIG. 3. Assume that the bytes 0 to 3 of the configuration register 170 store a start address "0x00000000" of the first node, the bytes 4 to 7 thereof store a search value "0x00000077", the byte 8 stores information indicating a forward search, the bytes 9 to 12 store, for each node, the backward-node address offset "0x00", the forward-node address offset "0x04", the comparison data offset "0x08" and the corresponding result offset "0x0C" in a row. After the processing unit 110 enables the linked-list search engine 500, the comparator 540 discovers the search value "0x00000077" in the node 340, drives the writing circuit 550 to store the corresponding result [PA4] and the start address "0x40" of the node 340, that are stored in the FIFO buffer 530, and information about a search success in the result register 590. In addition, the comparator 540 may drive the writing circuit 550 to store a counter value (that is, "5") in the result register 590.

Refer to FIG. 6. Since firmware may have two sets of configuration settings or more, that are frequently used, the linked-list search engine 600 may include shortcut (SC) registers 610_1 and 610_2, making the processing unit 110 to store two sets of configuration settings in the SC registers 610_1 and 610_2 in advance, respectively. Each set may include information about a memory address of a start node of the linked list 131, a search direction, a search value, and data structure for each node. Each set may additionally include information about the aforementioned mask and/or ignore bit. The linked list search engine 600 may further include a multiplexer 630 having inputs coupled to outputs of the SC registers 610_1 and 610_2, and an output coupled to an input of the configuration register 170. The processing unit 110 may output a select signal SE to the multiplexer 630 to couple one of the SC registers 610_1 and 610_2 to the configuration register 170, making the configuration register 170 to store the configuration settings of the coupled SC register. Although the embodiments illustrated in FIG. 6 include two SC registers, those artisans may modify the linked-list search engine 600 to incorporate with more SC registers and the invention should not be limited thereto. The references of detailed structures, functionalities and operations for the remaining elements of FIG. 6 may be made to the relevant descriptions of FIG. 5 and are omitted for brevity.

Refer to FIG. 7. To improve efficiency of parallelism, the linked-list search engine 700 may provide capabilities for conducting multiple searches. The processing unit 110 is allowed to provide several search values at one time, enabling the processing unit 110 to arrange searches on the linked list 131 and other tasks more flexible to improve the overall system performance. The processing unit 110 may allocate a fixed region for storing multiple search records 710. The processing unit 110 may further allocate a fixed region for storing multiple result records that can be updated by the linked-list search engine 700. Each search record 710 may include a search value and a start flag used to inform the linked-list search engine 700 whether a search on the linked list 131 has been triggered. Each result record 790 is associated with one search record 710 and may include a finish flag, a result flag, searched times and a memory address of the searched node. The finish flag is used to inform the processing unit 110 whether a search for the corresponding search value has completed. The result flat is used to inform the processing unit 110 whether the corresponding search value has been found in the linked list 131. The search records 710 and the result records 790 may be integrated with keys for easier access.

A reading circuit 720 may inspect whether a record including a start flag being "1" (indicating that a search has been triggered) and a finish flag being "0" (indicating that the search has not completed) is presented. Once detecting that any record has met the criteria, the reading circuit 720 stores the search value of this record in the configuration register 170. The references of detailed operations of the reading circuit 520 may be made to the relevant descriptions of FIG. 5 and are omitted for brevity. When determining that no node can be searched, the reading circuit 520 may output an enabling signal EN3 to the writing circuit 730 for driving the writing circuit 730 to store the search value and information about a search fail in a FIFO buffer 750. The writing circuit 730 may further store a quantity of nodes of the linked list 131 in the FIFO buffer 750 as searched times. When determining that the search value of the configuration register 170 is the same as the comparison data of the FIFO buffer 530, a comparator 740 may store the corresponding result and the start address of the currently searched node, that are stored in the FIFO buffer 530, and information about a search success in a FIFO buffer 750. The comparator 740 may further include a counter that is initiated to zero before a new search. The counter is increased by one each time the comparator 740 conducts a comparison of the search value of the configuration register 170 with the comparison data of the FIFO buffer 530. When determining that the search value of the configuration register 170 is the same as the comparison data of the FIFO buffer 530, the comparator 740 may further store the counter value in the FIFO buffer 750 as searched times. When the data is entered in the FIFO buffer 750, the writing circuit 760 may write the content of the FIFO buffer 750 into the corresponding result record 790 and output an enabling signal EN4 to the reading circuit 720 to advise the reading circuit 720 to read the next search record 710.

The following introduces several use cases with the linked list 131 as shown in FIG. 3 to explain how the linked-list search engine 700 operates. The search records 710 and the result records 790 may be integrated into one table and the table is initiated as Table 1:

TABLE 1

| Start[4]/ Done[0] | Pattern[31:0] | Result[31]/ Effort[30:0] | Address[31:0] |
| --- | --- | --- | --- |
| 0x10 | 0x000000AA | N/A | N/A |
| 0x10 | 0x00000044 | N/A | N/A |
| 0x00 | 0x00000052 | N/A | N/A |
| 0x00 | 0x00000055 | N/A | N/A |
| 0x00 | 0x00000000 | N/A | N/A |
| 0x00 | 0x00000000 | N/A | N/A |

Each record may use thirteen bytes to store data, in which one byte stores a start flag Start[4] (bit 4) and a finish flag Done[0] (bit 0), four bytes store search value Pattern[31:0] (all bits), four bytes store a result flag Result[31] (bit 31) and search times Effort[30:0] (bits 0 to 30) and four bytes store a memory address Address[31:0] (all bits) of the searched node. The start flag may be treated as a signal for enabling the linked-list search engine 700. Initially, the processing unit 110 writes four search values "0x000000AA", "0x00000044", "0x00000052" and "0x00000055" and sets the start flags for the beginning two search values to "1".

Next, the linked-list search engine 700 discovers that the value "0x000000AA" is stored in the node 370 of the linked list 131 and stores the corresponding result to that as shown in Table 2:

TABLE 2

| Start[4]/<br>Done[0] | Pattern[31:0] | Result[31]/<br>Effort[30:0] | Address[31:0] |
|---|---|---|---|
| 0x11 | 0x000000AA | 0x80000008 | 0x00000070 |
| 0x10 | 0x00000044 | N/A | N/A |
| 0x00 | 0x00000052 | N/A | N/A |
| 0x00 | 0x00000055 | N/A | N/A |
| 0x00 | 0x00000000 | N/A | N/A |
| 0x00 | 0x00000000 | N/A | N/A |

The writing circuit 760 may set the finish flag Done[0] of the first record to "1", the result flag Result[31] thereof to "1", the search times Effort[30:0] thereof to "0x8" and the memory address Address[31:0] of the searched node thereof to "0x00000070".

Next, the processing unit 110 appends two search values "0x00000066" and "0x00000067" to the table and sets all of the remaining start flags to "1". The updated table is shown in Table 3:

TABLE 3

| Start[4]/<br>Done[0] | Pattern[31:0] | Result[31]/<br>Effort[30:0] | Address[31:0] |
|---|---|---|---|
| 0x11 | 0x000000AA | 0x80000008 | 0x00000070 |
| 0x10 | 0x00000044 | N/A | N/A |
| 0x10 | 0x00000052 | N/A | N/A |
| 0x10 | 0x00000055 | N/A | N/A |
| 0x10 | 0x00000066 | N/A | N/A |
| 0x10 | 0x00000067 | N/A | N/A |

Next, the linked-list search engine 700 discovers that the value "0x00000044" is stored in the node 310 of the linked list 131 but the value "0x00000052" is absent from the linked list 131. Thereafter, the linked-list search engine 700 discovers that the value "0x00000055" is stored in the node 320 of the linked list 131. To reflect the above searches, the table is updated as shown in Table 5:

TABLE 4

| Start[4]/<br>Done[0] | Pattern[31:0] | Result[31]/<br>Effort[30:0] | Address[31:0] |
|---|---|---|---|
| 0x11 | 0x000000AA | 0x80000008 | 0x00000070 |
| 0x11 | 0x00000044 | 0x80000002 | 0x00000010 |
| 0x11 | 0x00000052 | 0x0000000A | N/A |
| 0x11 | 0x00000055 | 0x80000003 | 0x00000020 |
| 0x10 | 0x00000066 | N/A | N/A |
| 0x10 | 0x00000067 | N/A | N/A |

Those artisans may combine the linked-list search engines 500 to 700 into a single one and all elements except for the registers may share a mode signal. The processing unit 110 may configure the integrated linked-list search engine as one of that as shown in FIGS. 5 to 7 through the mode signal.

Although the embodiment has been described as having specific elements in FIGS. 1 and 5-7, it should be noted that additional elements may be included to achieve better performance without departing from the spirit of the invention. Each element of FIGS. 1 and 5-7 is composed of various circuits and arranged to operably perform the aforementioned operations. While the process flow described in FIG. 2 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for searching linked lists, comprising:
a memory arranged to operably store a linked list;
a linked-list search engine coupled to the memory and arranged to operably search content of the linked list until a search success or fail and generate a search result; and
a processing unit coupled to the memory and the linked-list search engine and arranged to operably write the content of the linked list into the memory, drive the linked-list search engine to start a search on the linked list and obtain the search result from the linked-list search engine for completing logical-to-physical location conversion,
wherein the linked list comprises a plurality of nodes, each node comprises a forward-node or backward-node address, comparison data and a corresponding result, the comparison data comprises a first host page number associated with a plurality of successive first logical block addresses (LBAs), the corresponding result comprises a physical location in a storage mapping table, which corresponds to the first host page number, and the storage mapping table stores information indicating which physical location that data associated with each host page is physically stored in a NAND flash memory device,
wherein the linked-list search engine comprises:
a first writing circuit;
a second writing circuit;
a configuration register, wherein the processing unit is arranged to operably set the configuration register to store a memory address of a start node of the linked list, and a search value, wherein the search value comprises a second host page number associated with a plurality of successive second LBAs;
a first reading circuit coupled to the configuration register and the first writing circuit, and arranged to operably read the nodes of the linked list according to content of the configuration register, and drive the first writing circuit to store information about a search fail when the second host page number in the configuration register is not found in the linked list, thereby enabling the processing unit to obtain the search fail information; and
a comparator coupled to the configuration register, the first reading circuit and the second writing circuit, and arranged to operably drive the second writing circuit to store a corresponding result of a matched node, and information about a search success when the second host page number in the configuration register is the same as the first host page number in one node, wherein the corresponding result of the matched node comprises a physical location in the storage mapping table, which corresponds to the second host page number, thereby enabling the processing unit to obtain the start address and the corresponding result of the matched node, and the search success information.

2. The apparatus of claim 1,
wherein the processing unit is arranged to operably set the configuration register to store data structure information of each node,
wherein the linked-list search engine is arranged to operably search the linked list according to the data structure information of the configuration register.

3. The apparatus of claim 2, wherein the data structure information of each node comprises an offset of the backward-node or forward-node address, an offset of the comparison data and an offset of the corresponding result.

4. The apparatus of claim 1, wherein the processing unit is arranged operably to execute a task parallelly during the linked-list search engine is arranged operably to search the content of the linked list.

5. The apparatus of claim 1, wherein the comparator is arranged to operably drive the first reading circuit to read the next node of the linked list when determining that the search value of the configuration register is different from comparison data of one node.

6. The apparatus of claim 1, wherein the linked-list search engine comprises:
a counter coupled to the comparator and the second writing circuit and arranged to operably be set to zero each time a new search starts,
wherein the comparator is arranged to operably increase the counter by one each time a comparison of the search value of the configuration register with comparison data of one node is performed, and drive the second writing circuit to store a counter value when the search value of the configuration register is the same as comparison data of one node, thereby enabling the processing unit to obtain the counter value.

7. The apparatus of claim 1, wherein the processing unit is arranged to operably set the configuration register to store a mask and the comparator is arranged to operably perform a logic AND operation on comparison data of each node with the mask of the configuration register to generate masked comparison data, and drive the second writing circuit to store a start address and a corresponding result of a matched node, and information about a search success when the search value of the configuration register is the same as the masked comparison data of one node.

8. The apparatus of claim 1, wherein the processing unit is arranged to operably set the configuration register to store information about a ignore bit and the comparator is arranged to operably generate a mask according to the information of the ignore bit, perform a logic AND operation on comparison data of each node with the mask to generate masked comparison data, and drive the second writing circuit to store a start address and a corresponding result of a matched node, and information about a search success when the search value of the configuration register is the same as the masked comparison data of one node.

9. The apparatus of claim 1, wherein the first writing circuit is arranged to operably store the start address and the corresponding result of the matched node, and information about the search success in a result register.

10. The apparatus of claim 1, wherein the linked-list search engine comprises:
a first shortcut register is arranged to operably store a first set of configuration settings;
a second shortcut register is arranged to operably store a second set of configuration settings; and
a multiplexer coupled to the first shortcut register, the second shortcut register and the configuration register, wherein the processing unit is arranged to operably output a select signal to the multiplexer to couple one of the first and second shortcut registers to the configuration register, thereby enabling the configuration register to store a corresponding set of configuration settings of the coupled shortcut register.

11. The apparatus of claim 1, wherein the memory is arranged to operably store a plurality of search records and the linked-list search engine comprises:
a second reading circuit coupled to the configuration register and arranged to operably read a search value from a search record when the search record indicates that a search for the read search value has been triggered but has not completed, and store the read search value in the configuration register.

12. The apparatus of claim 11, wherein the processing unit is arranged to operably provide search values of the search records.

13. The apparatus of claim 11, wherein the first writing circuit is arranged to operably store the start address and the corresponding result of the matched node, and information about a search success in a result record of the memory, which corresponds to the read value.

14. A method for searching linked lists, performed by a linked-list search engine comprising a first writing circuit, a second writing circuit, a configuration register, a first reading circuit, and a comparator, the method, comprising:
obtaining, by the first reading circuit, a memory address of a start node of a linked list, and a search value from the configuration register set by a processing unit, wherein the linked list comprises a plurality of nodes and each node comprises a forward-node or backward-node address, comparison data and a corresponding result, the comparison data comprises a first host page number associated with a plurality of successive first logical block addresses (LBAs), the corresponding result comprises a physical location in a storage mapping table, which corresponds to the first host page number, the storage mapping table stores information indicating which physical location that data associated with each host page is physically stored in a NAND flash memory device, and the search value comprises a second host page number associated with a plurality of successive second LBAs;
repeatedly executing, by the comparator, a loop for driving the first reading circuit to obtain and process a plurality of nodes of the linked list from the start node sequentially until a search success or fail;
driving, by the comparator, the second writing circuit to store a search result and information about a search success when the second host page number in the configuration register is the same as the first host page number in one node, wherein the search result comprises a physical location in a matched node, which corresponds to the second host page number, thereby enabling the processing unit to obtain the search result and the search success information; and
driving, by the comparator, the first writing circuit to store information about a search fail when the second host page number in the configuration register is not found in the linked list, thereby enabling the processing unit to obtain the search fail information.

15. The method of claim 14, wherein the processing unit is arranged operably to execute a task parallelly during the linked-list search engine is arranged operably to search the content of the linked list.

16. The method of claim 14, wherein the configuration register stores data structure information of each node and content of each node of the linked list is obtained according to the data structure information.

\* \* \* \* \*